(12) United States Patent
Etzel et al.

(10) Patent No.: US 11,642,957 B2
(45) Date of Patent: May 9, 2023

(54) CONTROL UNIT AND METHOD FOR OPERATING A HYBRID DRIVE WITH A DUAL CLUTCH TRANSMISSION

(71) Applicant: Bayerische Motoren Werke Aktiengesellschaft, Munich (DE)

(72) Inventors: Michael Etzel, Munich (DE); Michael Friedrich, Eching (DE); Sebastian Liebert, Unterfoehring (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 99 days.

(21) Appl. No.: 17/416,607

(22) PCT Filed: Dec. 11, 2019

(86) PCT No.: PCT/EP2019/084560
§ 371 (c)(1),
(2) Date: Jun. 21, 2021

(87) PCT Pub. No.: WO2020/143979
PCT Pub. Date: Jul. 16, 2020

(65) Prior Publication Data
US 2022/0080821 A1   Mar. 17, 2022

(30) Foreign Application Priority Data
Jan. 10, 2019   (DE) .................. 10 2019 100 503.5

(51) Int. Cl.
*B60W 10/113*   (2012.01)
*B60K 6/48*   (2007.10)
(Continued)

(52) U.S. Cl.
CPC ............... *B60K 6/48* (2013.01); *B60K 6/547* (2013.01); *B60W 10/06* (2013.01); *B60W 10/08* (2013.01);
(Continued)

(58) Field of Classification Search
CPC .... B60K 6/48; B60K 6/57; B60K 2006/4825; B60W 10/06; B60W 10/08; B60W 10/116;
(Continued)

(56) References Cited

U.S. PATENT DOCUMENTS 8,776,921 B2 * 7/2014 Richter ............... B60W 30/192
180/65.285
2013/0337973 A1   12/2013 Maass et al.
(Continued)

FOREIGN PATENT DOCUMENTS

DE   10 2007 050 659 A1   4/2009
DE   10 2010 044 618 A1   3/2012
(Continued)

OTHER PUBLICATIONS

English translation of EP2757005A2; http://translationortal.epo.org; Dec. 21, 2022 (Year: 2022).*
(Continued)

*Primary Examiner* — Roger L Pang
(74) *Attorney, Agent, or Firm* — Crowell & Moring LLP

(57) ABSTRACT

A hybrid drive includes a control unit, an internal combustion engine, an electrical machine and a dual clutch transmission having an output shaft. The dual clutch transmission includes a first sub-transmission and a second sub-transmission, each couplable to the output shaft. A drive shaft of the internal combustion engine is couplable to a first input shaft of the first sub-transmission via a first clutch and to a second input shaft of the second sub-transmission via a second clutch. The control unit is configured to permit the second clutch to be closed even when the hybrid drive is being operated purely electrically so that the driveshaft of the internal combustion engine is driven by the electrical
(Continued)

machine. A control unit and a method for operation of a hybrid drive are also provided.

14 Claims, 1 Drawing Sheet

(51) Int. Cl.
*B60K 6/547* (2007.10)
*B60W 10/06* (2006.01)
*B60W 10/08* (2006.01)
*B60W 20/40* (2016.01)
*B60W 30/19* (2012.01)
*F16H 61/688* (2006.01)

(52) U.S. Cl.
CPC .......... *B60W 10/113* (2013.01); *B60W 20/40* (2013.01); *B60W 30/19* (2013.01); *F16H 61/688* (2013.01); *B60K 2006/4825* (2013.01); *B60W 2710/021* (2013.01); *B60W 2710/027* (2013.01); *B60W 2710/0666* (2013.01); *B60W 2710/083* (2013.01); *B60Y 2200/92* (2013.01)

(58) Field of Classification Search
CPC ................. B60W 20/40; B60W 30/19; B60W 2710/021; B60W 2710/027; B60W 2710/0666; B60W 2710/083; F16H 61/688
USPC ................................................ 74/335; 475/5
See application file for complete search history.

(56) References Cited

U.S. PATENT DOCUMENTS

2014/0073480 A1* 3/2014 Blessing ............... B60W 20/10
903/902
2019/0084575 A1 3/2019 Luo et al.

FOREIGN PATENT DOCUMENTS

| DE | 10 2011 003 080 A1 | 7/2012 | |
|---|---|---|---|
| DE | 10 2016 209 006 A1 | 11/2017 | |
| EP | 2 757 005 A2 | 7/2014 | |
| WO | WO-2012167970 A1 * | 12/2012 | ............ B60W 10/02 |
| WO | WO 2017/060010 A1 | 4/2017 | |

OTHER PUBLICATIONS

English translation of DE102007050659A1; http://translationortal.epo.org; Dec. 21, 2022 (Year: 2022).*
English translation of DE102016209006A1; http://translationortal.epo.org; Dec. 21, 2022 (Year: 2022).*
English translation of WO2012167970A; http://translationortal.epo.org; Dec. 22, 2022 (Year: 2022).*
International Search Report (PCT/ISA/210) issued in PCT Application No. PCT/EP2019/084560 dated Apr. 7, 2020 with English translation (five (5) pages).
German-language Written Opinion (PCT/ISA/237) issued in PCT Application No. PCT/EP2019/084560 dated Apr. 7, 2020 (six (6) pages).
German-language Search Report issued in German Application No. 10 2019 100 503.5 dated Oct. 28, 2019 with partial English translation (12 pages).

* cited by examiner

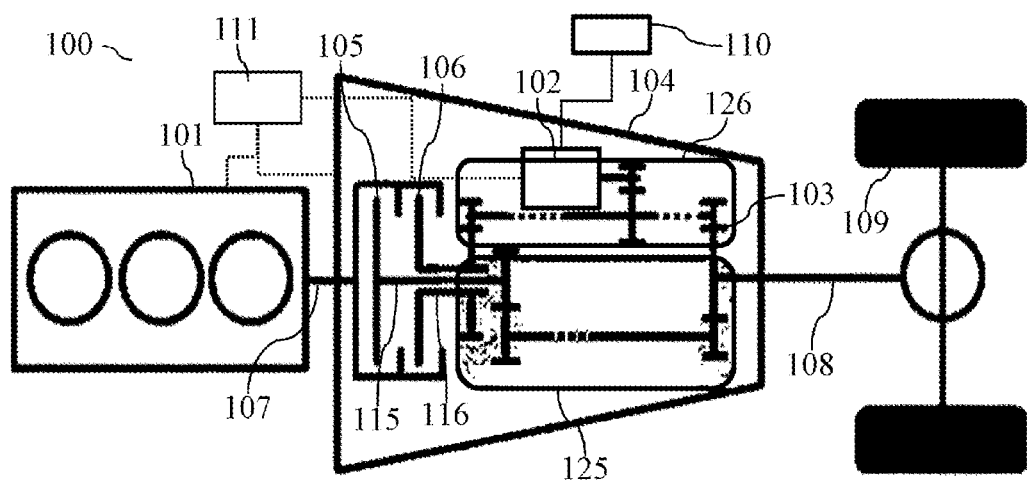
Fig. 1
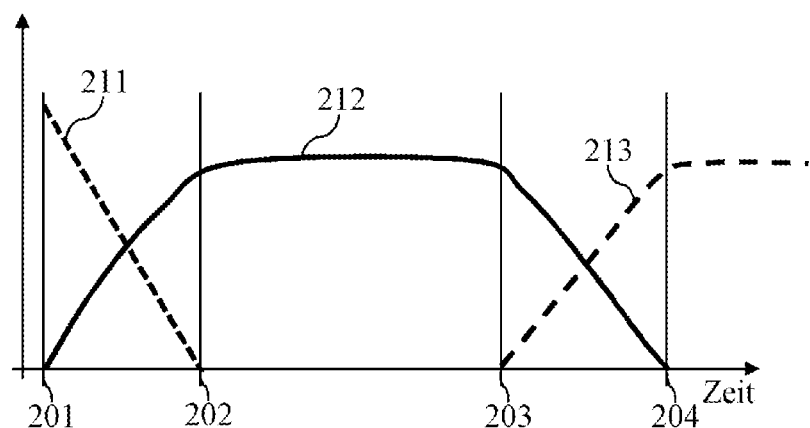
Fig. 2
300 — | Driving of the drive shaft of the internal combustion engine, even during purely electric operation of the hybrid drive | — 301
Fig. 3

CONTROL UNIT AND METHOD FOR OPERATING A HYBRID DRIVE WITH A DUAL CLUTCH TRANSMISSION

BACKGROUND AND SUMMARY OF THE INVENTION

The invention relates to a hybrid drive. In particular, the invention relates to the operation of a hybrid drive which has a double clutch transmission with an electric machine.

A vehicle with a hybrid drive comprises an internal combustion engine and at least one electric machine which can in each case be used individually and/or together, in order to deliver a drive torque which is required at a transmission of the vehicle. In order to reduce the required installation space, the electric machine can be attached only to one sub-transmission of a double clutch transmission of the vehicle. An arrangement of this type of the electric machine can, however, reduce the possible uses of the electric machine for the operation of the vehicle.

The present document is concerned with the technical object of making comprehensive use of the electric machine during the operation of a hybrid drive, in particular for purely electric driving, possible, even in the case of the arrangement of the electric machine on only one sub-transmission of a double clutch transmission.

The object is achieved in each case by the independent claims. Advantageous embodiments are described, inter alia, in the dependent claims. It is noted that, without the features of the independent patent claim or only in combination with a part quantity of the features of the independent patent claim, additional features of a patent claim which is dependent on an independent patent claim can form a separate invention which is independent of the combination of all the features of the independent patent claim and can be made the subject matter of an independent claim, a divisional application or a subsequent application. This applies in the same way to technical teachings which are described in the description and can form an invention which is independent of the features of the independent patent claims.

In accordance with one aspect, a control unit for a hybrid drive is described, it being possible for the hybrid drive to be configured for driving a motor vehicle. The hybrid drive comprises an internal combustion engine (for example, a diesel engine or a four-stroke gasoline engine), an electric machine and a double clutch transmission with an output shaft. The output shaft can be set up to drive one or more wheels of a motor vehicle.

The double clutch transmission comprises a first sub-transmission and a second sub-transmission which are coupled or can be coupled in each case to the output shaft. Here, the two sub-transmissions can in each case comprise different gears with different transmission ratios between an input shaft and an output shaft of the double clutch transmission. In particular, the odd gears (for example, 1, 3, 5, etc.) can be provided by way of one of the two sub-transmissions, and the even gears (for example, 2, 4, 6, etc.) can be provided by way of the other sub-transmission. The sub-transmissions can in each case be automated transmissions. The different gears can be engaged and/or changed by way of electrically actuable shifting elements of the transmissions.

The drive shaft (in particular, the crankshaft) of the internal combustion engine can be capable of being coupled via a first coupling to a first input shaft of the first sub-transmission and via a second clutch to a second input shaft of the second sub-transmission. Here, the clutches can be configured in such a way that a degree of coupling of the respective clutch can be varied (for example, between 0% in the case of an open clutch and 100% in the case of a closed clutch). Here, the degree of coupling can indicate the proportion of the torque at an input of the clutch, which proportion is transmitted via the clutch to an output of the clutch. The input shafts of the clutches can be coaxial with respect to one another. For example, one of the two input shafts can be configured as a solid shaft which is enclosed by another input shaft which is configured as a hollow shaft.

The electric machine can be attached to the second sub-transmission, for example to the second input shaft of the second sub-transmission. In particular, the electric machine can be arranged in such a way that a torque which is brought about by the electric machine can be transmitted exclusively via the second input shaft to the output shaft and/or to the first input shaft. An arrangement of this type of the electric machine makes an installation of the electric machine possible, which installation is efficient in terms of installation space.

The electric machine can be operated with electric energy from an electric energy store of the hybrid drive. Here, the energy store can have a nominal voltage in the high voltage range (for example, at 300 V or more) or in the low voltage range (for example, at 60 V or less, in particular at 48 V). The electric energy from the energy store can be converted by means of an inverter into an alternating current for operating the electric machine.

The control unit can be set up to bring it about that the second clutch is closed even when the hybrid drive is operated in a purely electric manner, with the result that the drive shaft of the internal combustion engine is driven by way of the electric machine. In other words, the hybrid drive can be operated in such a way that, even when only the electric machine is operated in an active manner, the second clutch is closed at least partially or completely, in order to move the drive shaft (in particular, the crankshaft) of the internal combustion engine in a coupled manner.

That operation of a hybrid drive which is described in this document makes it possible for the internal combustion engine to be activated briefly by way of the coupled motion of the drive shaft of the internal combustion engine, for example in order to carry out a shifting operation without interruption of the torque which is provided at the output shaft by way of brief activation of the internal combustion engine even in the case of purely electric operation of the hybrid drive (outside the shifting operation). In this way, torque interruption-free shifting operations are made possible even in the case of an attachment of the electric machine to only one sub-transmission of a double clutch transmission.

The control unit can be set up to determine that a torque of the electric machine is to be transmitted via a gear of the first sub-transmission to the output shaft. For example, the first sub-transmission can have the first gear of the double clutch transmission. It can be determined that a purely electric starting maneuver is to be carried out by means of a gear of the first sub-transmission. In reaction to this, the first clutch can be closed, in particular regulated, while the torque transmission path from the electric machine via the second sub-transmission to the output shaft is interrupted or remains interrupted. In particular, the second sub-transmission can be operated without an engaged gear for this purpose.

In this way, by way of the use of a closed second clutch and by way of (regulated) closing of the first clutch, a transmission of the torque of the electric machine can be brought about via the two closed clutches to the first sub-transmission and from there to the output shaft. A purely electric starting maneuver can thus be made possible in an efficient way. In a corresponding way, shifting operations from an engaged gear of the second sub-transmission to a gear of the first sub-transmission and/or in the opposite direction can be implemented. In this way, all the gears of the double clutch transmission can be utilized for purely electric operation of the hybrid drive in an efficient way, even in the case of the attachment of the electric machine to only one sub-transmission of a double clutch transmission. In this way, extended use of the electric machine is made possible.

The control unit can be set up to determine that, starting from an initial shifting state, in the case of which a torque of the electric machine is transmitted via the first sub-transmission to the output shaft, the electric machine is to be transferred into a target shifting state, in the case of which the torque of the electric machine is transmitted via the second sub-transmission to the output shaft. Here, the hybrid drive can be operated, in particular, in a purely electric manner, that is to say the internal combustion engine can be deactivated or not fired up.

The internal combustion engine can then be fired up temporarily for a transition from the initial shifting state to the target shifting state, in order to bring it about that the torque which is brought about at the output shaft by the electric machine before the transition is brought about at least partially or completely by the internal combustion engine during the transition. In other words, brief firing up of the internal combustion engine can achieve a situation where no (or at least no complete) interruption of the torque at the output shaft occurs in the case of a shifting operation from a gear of the first sub-transmission to a gear of the second sub-transmission. In this way, a shifting operation which is free from an interruption of traction power is made possible in an efficient way even in the case of purely electric driving.

In particular, the control unit can be set up to determine the initial value of the torque which is brought about by the electric machine at the output shaft before or at the beginning of the transition. The second clutch can then be opened for the transition in such a way that the torque at the output shaft does not undershoot the initial value during the transition. As an alternative or in addition, the second clutch can be opened in such a way that the torque at the output shaft deviates from the initial value by less than 10% during the (entire) transition. The degree of coupling of the clutch can therefore be set, in particular regulated, in such a way that the torque at the output shaft remains substantially unchanged.

The control unit can be set up to open the second clutch for the transition from the initial switching state into the target switching state in a manner which is dependent on a value of the torque which is brought about by the internal combustion engine at the drive shaft. In particular, the control unit can be set up to determine a temporal internal combustion engine torque profile which indicates how a value of the torque which is brought about by the internal combustion engine at the drive shaft increases in an initial phase of the transition. The internal combustion engine torque profile can be determined and stored beforehand, for example, in the form of characteristics for the internal combustion engine. The degree of coupling of the second clutch can then be reduced in a manner which is dependent on the internal combustion engine torque profile in the starting phase of the transition, in order to keep the torque which is provided at the output shaft stable in a reliable way.

The control unit can be set up to reduce a torque which is brought about by the electric machine at the second input shaft for the transition from the initial shifting state to the target shifting state, in particular to reduce it as far as zero. That gear of the second sub-transmission which is required for the target shifting state can then be set in a reliable way if the electric machine brings about a reduced torque, in particular a torque of zero. The electric machine can possibly be decoupled from the second input shaft for the engaging of the required gear of the second sub-transmission via a shifting element.

Furthermore, the control unit can be set up to determine a temporal electric motor torque profile which indicates how a value of the torque which is brought about by the electric machine at the second input shaft is reduced in the initial phase of the transition. The electric motor torque profile can possibly be determined beforehand and stored as characteristics. The degree of coupling of the second clutch can then (possibly also) be set in a manner which is dependent on the electric motor torque profile. The homogeneity of the torque at the output shaft can thus be improved further in the case of a shifting operation.

The control unit can be set up to open the first clutch and (possibly) to close the second clutch again in the end phase of the transition. Furthermore, the firing up of the internal combustion engine can be ended (with the result that the drive shaft of the internal combustion engine is again driven in coupled motion by the electric machine). Moreover, it can be brought about that a torque is brought about by way of the electric machine, which torque is transmitted via the second sub-transmission to the output shaft. In this way, a shifting operation can be concluded in a reliable way.

In particular, the control unit can be set up to determine a temporal internal combustion engine torque profile which indicates how a value of the torque which is brought about by the internal combustion engine at the drive shaft decreases in the end phase of the transition (for example, by way of ending of the firing up of the internal combustion engine). The internal combustion engine torque profile can be determined beforehand and stored as characteristics. The degree of coupling of the first clutch can then be reduced in a manner which is dependent on the internal combustion engine torque profile. As an alternative or in addition, the torque which is brought about by the electric machine can be increased in a manner which is dependent on the internal combustion engine torque profile. A substantially constant traction power can thus be brought about at the output shaft even in the end phase of a shifting transition. Furthermore, the time duration of the firing up of the internal combustion engine in the case of shifting operations can be reduced by way of the consideration of the internal combustion engine torque profile of the internal combustion engine at the beginning or at the end of firing up, with the result that particularly energy-efficient shifting operations are made possible.

In accordance with a further aspect, a method for operating a hybrid drive is described, the hybrid drive comprising an internal combustion engine, an electric machine and a double clutch transmission with an output shaft. The double clutch transmission comprises a first sub-transmission and a second sub-transmission which are coupled or can be coupled in each case to the output shaft. The drive shaft of the internal combustion engine can be coupled via a first clutch to a first input shaft of the first sub-transmission, and can be coupled via a second clutch to a second input shaft of the second sub-transmission. The method comprises operating of the second clutch in the closed state if the hybrid drive is operated in a purely electric manner, with the result that the drive shaft of the internal combustion engine is driven by way of the electric machine.

In accordance with a further aspect, a (road) motor vehicle (in particular, a passenger motor car or a truck or a bus or a motorcycle) is described which comprises the control unit which is described in this document.

In accordance with a further aspect, a software (SW) program is described. The SW program can be set up to be run on a processor (for example, on a control unit of a vehicle), and, as a result, to carry out the method which is described in this document.

In accordance with a further aspect, a storage medium is described. The storage medium can comprise an SW program which is set up to be run on a processor, and, as a result, to carry out the method which is described in this document.

It is to be noted that the methods, apparatuses and systems which are described in this document can be used both on their own and in combination with other methods, apparatuses and systems which are described in this document. Furthermore, any aspects of the methods, apparatuses and systems which are described in this document can be combined with one another in a wide variety of ways. In particular, the features of the claims can be combined with one another in a wide variety of ways.

In the further text, the invention will be described in greater detail on the basis of exemplary embodiments.

BRIEF DESCRIPTION OF THE DRAWINGS

FIG. 1 shows a hybrid drive of a vehicle in accordance with an embodiment of the present invention, FIG. 2 shows a torque profile in the case of brief firing up of an internal combustion engine in accordance with an embodiment of the present invention, and FIG. 3 shows a flow chart of a method for operating a hybrid drive in accordance with an embodiment of the present invention.

DETAILED DESCRIPTION OF THE DRAWINGS

As indicated at the outset, the present document is concerned with the operation of a hybrid drive, in particular for purely electric driving. In this context, FIG. 1 shows a block diagram of an exemplary hybrid drive of a vehicle 100. The hybrid drive comprises an internal combustion engine 101 and an electric machine 102 which can be utilized separately or together, in order to generate a drive torque for the vehicle 100. The internal combustion engine 101 and the electric machine 102 are arranged in such a way that the torques which are generated by way of the respective drive motor are added up to form an overall drive torque which is transmitted via a transmission 104 and an output shaft 108 of the transmission 104 to one or more wheels 109 of the vehicle 100. The electric energy for the operation of the electric machine 102 can be stored in an electric energy store 110.

Furthermore, the vehicle 100 comprises a control unit 111 (for example, a motor control unit) which is set up to determine a requested overall torque. The requested overall torque can be specified by a driver of the vehicle, for example, via an accelerator pedal and/or via a setting of the transmission 104. For example, a driver can actuate the accelerator pedal, in order to request an increased overall torque. The control unit 111 can be set up to divide the requested overall torque into a first torque (for the internal combustion engine 101) and into a second torque (for the electric machine 102). In other words, the control unit 111 can be set up to operate the internal combustion engine 101 and the electric machine 102 in a manner which is dependent on a requested overall torque.

The vehicle 100 comprises a double clutch transmission 104 which has a first clutch 105 which is set up to couple the drive shaft 107 of the internal combustion engine 101 by way of a first input shaft 115 to a first sub-transmission 125 of the transmission 104 or to decouple said drive shaft 107 from said first sub-transmission 125. Furthermore, the transmission 104 has a second clutch 106 which is set up to couple the drive shaft 107 of the internal combustion engine 101 by way of a second input shaft 116 to a second sub-transmission 126 of the transmission 104 or to decouple said drive shaft 107 from said second sub-transmission 126.

The first input shaft 115 and the second input shaft 116 are typically coaxial with respect to one another. In particular, the first input shaft 115 can be a solid shaft which is enclosed by the second input shaft 116 which is configured as a hollow shaft. The first input shaft 115 can be coupled to the output shaft 108 via the first sub-transmission 125, and a gear which is set therein. Furthermore, the second input shaft 115 can be coupled to the output shaft 108 via the second sub-transmission 126, and a gear which is set therein. For example, the odd gears (for example, 1, 3, 5, etc.) can be provided by way of the first sub-transmission 125, and the even gears (for example, 2, 4, 6, etc.) can be provided by way of the second transmission gear 126. The first and/or second sub-transmission 125, 126 typically have/has one or more shifting elements 103, via which the different gears of the respective sub-transmission 125, 126 can be engaged in an automated manner, and/or via which the respective sub-transmission 125, 126 can be set into a neutral position (without an engaged gear). In a neutral position, the input shaft 115, 116 of a sub-transmission 125, 126 is typically decoupled from the output shaft 108.

The electric machine 102 of the hybrid drive can be capable of being coupled to one of the two sub-transmissions 125, 126 in a way which is efficient in terms of installation space, or can be attached to only one of the two sub-transmissions 125, 126. In particular, the electric machine 102 can be capable of being coupled directly to the input shaft 115, 116 of one of the two sub-transmissions 125, 126. Furthermore, the electric machine 102 can be arranged in such a way that coupling to the input shaft 115, 116 of the respective other sub-transmission 125, 126 is possible only via the clutches 105, 106.

In the example which is shown in FIG. 1, the electric machine 102 is incorporated into the drive train of the vehicle 100 via the second sub-transmission 126, in particular via the second input shaft 116. In particular, the electric machine 102 can be coupled to the second sub-transmission 126 (for example, by way of acting on the second input shaft 116) in such a way that the electric machine 102 acts on the output shaft 108 via the shifting elements 103 of the second sub-transmission 126 (and therefore via the gears or transmission ratios which are provided by the second sub-transmission 126), without closing of the first or second clutch 105, 106 being required for this purpose. Secondly, it can be required that both the first and the second clutch 105, 106 are closed at least partially or completely, in order to transmit a torque from the electric machine 102 via the first sub-transmission 125 to the output shaft 108.

FIG. 1 therefore shows a drive train with an internal combustion engine 101 and a double clutch transmission 104. Here, an electric machine 102 is attached to the second sub-transmission 126 of the double clutch transmission 104 (which has, for example, the even gears). The electric machine 102 is attached upstream (in relation to the output shaft 108 of the transmission 104) of the shifting elements 103 of the second sub-transmission 126, and can therefore be coupled to the output shaft 108 via the shifting elements 103 of the second sub-transmission 126 to the output shaft 108, or can be decoupled therefrom. The transmission 104 can be disconnected from the internal combustion engine 101 by way of the clutches 105, 106 (in particular, in a regulated way). In the example which is shown in FIG. 1, the even gears are situated in the first sub-transmission 125. The first sub-transmission 125 does not have a (direct) attachment to the electric machine 102. The output of the transmission 104, that is to say the output shaft 108, is connected to the road by way of the wheels 109 of the vehicle 100.

On account of the attachment of the electric machine 102 to only one sub-transmission (for example, the second sub-transmission 126), all the shifting states or gears of the transmission 104 cannot typically be provided without an interruption in traction power in the case of purely electric driving, in the case of which the sole propulsion is brought about by way of the electric machine 102. This leads to reduced comfort for an occupant of a vehicle 100.

In the case of (sole) drive of the vehicle 100 by way of the electric machine 102, the second clutch 106 of the transmission 104 can be closed, with the result that the internal combustion engine 101 is driven in coupled motion by way of the electric machine 102. This makes it possible for the internal combustion engine 101 (in particular, a four-stroke gasoline engine) to be fired up briefly, with the result that a torque is produced briefly by way of the internal combustion engine 101. In the case of purely electric driving, in particular, the second clutch 106 can be kept closed, with the result that the drive shaft 107 of the internal combustion engine 101 is driven, and therefore fuel can be injected briefly into the internal combustion engine 101, in order to generate a torque by way of the internal combustion engine 101, which torque can be used to counteract an interruption in traction power in the case of a shifting operation within the transmission 104.

In the case of purely electric driving, the second clutch 106 can therefore fundamentally be closed. In this way, the internal combustion engine 101 is driven by coupled motion in accordance with the rotational speed of the second sub-transmission 126. This makes a (quasi) delay-free load takeover of the internal combustion engine 101 from the electric machine 102 possible.

In the example which is shown in FIG. 1, (electric) driving off in the first gear (via the first sub-transmission 125) can be realized in such a way that the second sub-transmission 126 (to which the electric machine 102 is attached) is decoupled from the output shaft 108 via the one or more shifting elements 103 of the second sub-transmission 126, but in the process is connected to the internal combustion engine 101 via the first sub-transmission 125. Subsequently, driving off can be performed electrically by way of a regulated and/or slipping first clutch 105. The torque of the electric machine 102 is then transmitted via the closed first and second clutches 105, 106 and via the first sub-transmission 125 to the output shaft 108. Even in the case of a connection of the electric machine 102 to the second sub-transmission 126, the one or more gears of the first sub-transmission 125 can thus be provided for electric driving (in particular, for a starting up operation).

During a shifting operation (in particular, in the case of purely electric driving), the internal combustion engine 101 can fundamentally temporarily assume the task of torque setting by way of temporary firing up of the internal combustion engine 102. The electric machine 102 can then be set to zero torque in order to shift the one or more shifting elements 103 for a gear change in the second sub-transmission 126. The internal combustion engine 101 therefore ensures a shifting operation which is free from an interruption of traction power. After conclusion of the shifting operation, the firing up of the internal combustion engine 101 can be switched off again, and the torque setting can be assumed again by way of the electric machine 102.

If the electric machine 102 is coupled via the second sub-transmission 126 to the output shaft 108 (for example, for an even gear), the next higher gear (for example, an even gear) can already be engaged in the first sub-transmission 125 in the case of a (temporarily) open second clutch 106. Decoupling of the second sub-transmission 126 from the output shaft 108 and closing of the second clutch 106 can then take place temporally in parallel, in order to carry out the gear change in a manner which is free from an interruption of traction power (even without firing up of the internal combustion engine 101).

If, secondly, the electric machine 102 is coupled via the first sub-transmission 125 to the output shaft 108 (for example, for an odd gear), the required torque for the drive of the vehicle 100 for a gear change to the next higher gear can be produced by the internal combustion engine 101 by way of temporary firing up of the internal combustion engine 101. The second clutch 106 can be opened (temporarily), and the electric machine 101 can be set to zero torque for a shifting operation in the second sub-transmission 126. After engaging of the next higher gear in the second sub-transmission 126, the second sub-transmission 126 can be coupled to the output shaft 108, and the firing up of the internal combustion engine 101 can be ended. The torque can then be set again by way of the electric machine 102.

During traction operation of the vehicle 100 (that is to say, in the case of upshifts), shifting operations from even into odd gears can therefore be carried out in the case of electric driving selectively without firing up of the internal combustion engine 101. Secondly, a temporary load takeover by way of the internal combustion engine 100 in the case of a shifting operation from the second sub-transmission 126 to the first sub-transmission 125, the shifting element 103 in the second sub-transmission 126 can be set to a load-free state by way of the electric machine 102 for disengagement. Here, the drive power is taken over by the internal combustion engine 101, the internal combustion engine 101 acting on the output or on the output shaft 108 via the first sub-transmission 125 by way of a closed first clutch 105. Here, the second clutch 106 is open. As soon as the internal combustion engine 101 provides the full driving power in the direction of the output, and the electric machine 102 corotates without load, the gear in the second sub-transmission 126 can be disengaged. Subsequently, the electric machine 102 can be synchronized to the input rotational speed of the transmission 104, the second clutch can then be closed, and the load can be faded over again from the internal combustion engine 101 to the electric machine 102.

Shifting operations from odd into even gears in the case of electric driving typically always require firing up of the internal combustion engine 100. Here, a correspondingly coordinated regulation of the clutches 105, 106 can take place, in order to shift the torque at the output shaft 108 as seamlessly as possible between the electric machine 102 and the internal combustion engine 101.

FIG. 2 shows an exemplary temporal torque profile 212 of the torque which is produced by the internal combustion engine 101 as a function of time during a transition from an initial shifting state of the transmission 104 to a target shifting state of the transmission 104. In the initial shifting state, the torque which is brought about by the electric machine 102 can be transmitted, for example, via the closed second clutch 106 and via the closed first clutch 105 to the first sub-transmission 125 and from there to the output shaft 108 (for example, for an odd gear). The torque transmission path from the electric machine 102 via the second sub-transmission 126 to the output shaft 108 is then interrupted (for example, by way of a neutral position of the second sub-transmission 126).

Secondly, the target shifting state can be such that the torque which is brought about by the electric machine 102 is transmitted directly from the second sub-transmission 126 to the output shaft 108 (for example, for an even gear). The first clutch 105 is then typically opened.

At the beginning of the transition from the initial shifting state to the target shifting state (that is to say, at the time 201), the firing up of the internal combustion engine 101 can begin, as a result of which the torque which is brought about by the internal combustion engine 101 at the drive shaft 107 rises in accordance with the torque profile 212. The degree of coupling 211 of the second clutch 106 can then be reduced in a manner which is dependent on the torque profile 212, in order to reduce the electric motor torque which is brought about at the first input shaft 115 in parallel with the rise of the internal combustion engine torque. As an alternative or in addition, the electric motor torque which is brought about by the electric machine 102 can be reduced in a manner which is dependent on the torque profile 212. In total, it can thus be brought about that the torque at the output shaft 108 remains substantially constant.

The second clutch 106 is opened completely at the time 202. The gear which is required for the target shifting state can then be engaged in the second sub-transmission 126 (while no torque is brought about on the second sub-transmission 126 by the electric machine 102). After setting of the second sub-transmission 126, the first clutch 105 can then (at the time 203) be opened and the second clutch 106 can be closed. Furthermore, the firing up of the internal combustion engine 101 can be ended, and the torque 213 which is brought about by the electric machine 102 can be increased (in a complementary way). It can thus be brought about even in this end phase that the torque at the output shaft 108 remains substantially constant. The transition or shifting operation is then concluded at the time 204.

FIG. 3 shows a flow chart of an exemplary method 300 for operating a hybrid drive, in particular a hybrid drive of a vehicle 100. The hybrid drive comprises an internal combustion engine 101, an electric machine 102 and a double clutch transmission 104 with an output shaft 108. Here, the output shaft 108 drives, for example, one or more wheels 109 of a vehicle 100.

The double clutch transmission 104 comprises a first sub-transmission 125 (for example, for the odd gears) and a second sub-transmission 126 (for example, for the even gears) which are coupled or can be coupled in each case to the output shaft 108. The drive shaft 107 of the internal combustion engine 101 can be capable of being coupled via a first clutch 105 to the first input shaft 115 of the first sub-transmission 125 and via a second clutch 106 to the second input shaft 116 of the second sub-transmission 126. In particular, the coupling action can be established by way of closing of the respective clutch 105, 106, and the coupling action can be stopped by way of opening of the respective clutch 105, 106.

The electric machine 102 can be attached (possibly exclusively) to the second sub-transmission 126. In other words, the electric machine 102 can be attached for reasons of complexity either only to the first sub-transmission 125 or only to the second sub-transmission 126. In particular, the electric machine 102 can be attached in such a way that a torque which is brought about by the electric machine 102 can be distributed or transmitted exclusively via the second input shaft 116 (for example, to the output shaft 108).

The method 300 comprises operating 301 of the second clutch 106 in a closed state if the hybrid drive is operated in a purely electric manner. The closing of the second clutch 106 can bring it about that the drive shaft 107 of the internal combustion engine 101 is driven by way of the electric machine 102. This makes it possible for the internal combustion engine 101 to be activated or to be fired up briefly, in order to provide assistance, for example, in a shifting operation of the hybrid drive in the case of purely electric operation (before and/or after the shifting operation). In this way, shifting which is free from interruption of the traction power can be made possible even in the case of purely electric operation of a hybrid drive, in the case of which the electric machine is incorporated via the second sub-transmission 126.

The measures which are described in this document make shifting operations which are free from interruption of the traction power possible even in the case of purely electric driving by way of an electric machine 102 which is attached directly to a sub-transmission 126 of a double clutch transmission 104. The full spectrum of transmission ratios of a double clutch transmission 104 can thus also be utilized for electric operation, which extends the possible operating range of purely electric driving. Furthermore, the energy efficiency and the $CO_2$ efficiency of a hybrid drive can thus be increased (even in the case of brief firing up of the internal combustion engine 101).

The present invention is not restricted to the exemplary embodiments which are shown. In particular, it is to be noted that the description and the figures are intended to illustrate merely the principle of the proposed methods, apparatuses and systems.

What is claimed is:

1. A hybrid drive, comprising:
   an internal combustion engine having a drive shaft;
   an electric machine;
   a double clutch transmission having an output shaft, a first sub-transmission and a second sub-transmission, the first sub-transmission and the second sub-transmission each being couplable to the output shaft; and
   a control unit, wherein
      the electric machine is coupled to the second sub-transmission,
      the drive shaft of the internal combustion engine is couplable via a first clutch to a first input shaft of the first sub-transmission and via a second clutch to a second input shaft of the second sub-transmission,
      the control unit is configured to control the second clutch to be closed when the hybrid drive is operated solely by the electric machine such that the drive shaft of the internal combustion engine is driven by the electric machine,
      the control unit is configured to, upon determining that a torque of the electric machine is to be transmitted via a gear of the first sub-transmission to the output shaft, close the first clutch while a torque transmission path from the electric machine via the second sub-transmission to the output shaft is interrupted, and starting from an initial shifting state in which a torque of the electric machine is being transmitted via the first sub-transmission to the output shaft, the control unit is configured to determine that the electric machine is to be transferred into a target shifting state in which a torque of the electric machine is to be transmitted via the second sub- transmission to the output shaft, and operate the internal combustion engine, during a transition from the initial shifting state to the target shifting state, such that an engine torque from the drive shaft of the internal combustion engine transferred to the output shaft is equal to a torque being transferred to the output shaft by the electric machine before the transfer into the target shifting state.

2. The hybrid drive according to claim 1, wherein the control unit is configured to open the second clutch in a manner which is dependent on a value of the torque from the drive shaft of the internal combustion engine.

3. The hybrid drive according to claim 2, wherein the control unit is configured to determine a temporal increasing internal combustion engine torque profile corresponding to how the value of the torque from the drive shaft of the internal combustion engine increases in an initial phase of the transition, and reduce a degree of coupling of the second clutch in a manner which is dependent on the temporal increasing internal combustion engine torque profile.

4. The hybrid drive according to claim 3, wherein the control unit is configured to reduce the torque from the electric machine at the second input shaft during the transition from the initial shifting state to the target shifting state, and shift a gear of the second sub-transmission required for the target shifting state into an engaged state when the electric machine the torque from by the electric machine is reduced to zero.

5. The hybrid drive according to claim 4, wherein the control unit is configured to determine a temporal decreasing electric motor torque profile corresponding to how a value of the torque from the electric machine at the second input shaft is reduced during the initial phase of the transition, and set the degree of coupling of the second clutch in a manner which is dependent on the temporal decreasing electric motor torque profile.

6. The hybrid drive according to claim 2, wherein the control unit is configured to determine a temporal decreasing electric motor torque profile corresponding to how a value of the torque from the electric machine at the second input shaft is reduced during the initial phase of the transition, and set the degree of coupling of the second clutch in a manner which is dependent on the temporal decreasing electric motor torque profile.

7. The hybrid drive according to claim 6, wherein the control unit is configured to determine the initial value of the torque from the electric machine at the output shaft before the transition, and open the second clutch such that the torque at the output remains substantially constant during the transition.

8. The hybrid drive according to claim 6, wherein the control unit is configured to determine the initial value of the torque from the electric machine at the output shaft before the transition, and open the second clutch such that the torque at the output shaft does not undershoot the initial value during the transition.

9. The hybrid drive according to claim 6, wherein the control unit is configured to determine the initial value of the torque from the electric machine at the output shaft before the transition, and open the second clutch such that the torque at the output shaft deviates from the initial value by less than 10% during the transition.

10. The control hybrid drive according to claim 6, wherein the control unit is configured to open the first clutch and to close the second clutch in an end phase of the transition, stop operation of the internal combustion engine, and transfer torque from the electric machine torque via the second sub- transmission to the output shaft.

11. The hybrid drive according to claim 6, wherein the control unit is configured to determine a temporal decreasing internal combustion engine torque profile corresponding to how the value of the torque from drive shaft of the internal combustion engine decreases in an end phase of the transition; and at least one of reduce the degree of coupling of the first clutch in a manner which is dependent on the temporal decreasing internal combustion engine torque profile, and increase a torque from the electric machine in a manner which is dependent on the temporal decreasing internal combustion engine torque profile.

12. The hybrid drive according to claim 1, wherein the electric machine is at least one of coupled to the second input shaft of the second sub-transmission, and arranged such that a torque from the electric machine is transmittable exclusively via the second input shaft to at least one of the output shaft and the first input shaft.

13. A control unit for a hybrid drive having an internal combustion engine, a double clutch transmission having an output shaft, a first sub-transmission and a second sub-transmission, the first sub-transmission and the second sub-transmission each being couplable to the output shaft, and an electric machine coupled to the second sub-transmission, the drive shaft of the internal combustion engine being couplable via a first clutch to a first input shaft of the first sub-transmission and via a second clutch to a second input shaft of the second sub-transmission, wherein the control unit is configured to control the second clutch to be closed when the hybrid drive is operated solely by the electric machine such that the drive shaft of the internal combustion engine is driven by the electric machine, the control unit is configured to, upon determining that a torque of the electric machine is to be transmitted via a gear of the first sub-transmission to the output shaft, close the first clutch while a torque transmission path from the electric machine via the second sub-transmission to the output shaft is interrupted, and starting from an initial shifting state in which a torque of the electric machine is being transmitted via the first sub-transmission to the output shaft, the control unit is configured to determine that the electric machine is to be transferred into a target shifting state in which a torque of the electric machine is to be transmitted via the second sub-transmission to the output shaft, and operate the internal combustion engine, during a transition from the initial shifting state to the target shifting state, such that an engine torque from the drive shaft of the internal combustion engine transferred to the output shaft is equal to a torque being transferred to the output shaft by the electric machine before the transfer into the target shifting state.

14. A method for operating a hybrid drive, the hybrid drive comprising an internal combustion engine having a drive shaft, an electric machine, a control unit, and a double clutch transmission having an output shaft and a first sub-transmission and a second sub-transmission each couplable to the output shaft, the drive shaft of the internal combustion engine being couplable via a first clutch to a first input shaft of the first sub-transmission and via a second clutch to a second input shaft of the second sub-transmission; the electric machine being coupled to the second sub-transmission; the method comprising acts of:

operating the second clutch in a closed state when the hybrid drive is being operated solely by the electric machine such that the drive shaft of the internal combustion engine is driven by the electric machine, upon determining that a torque of the electric machine is to be transmitted via a gear of the first sub-transmission to the output shaft, closing the first clutch while a torque transmission path from the electric machine via the second sub-transmission to the output shaft is interrupted; and starting from an initial shifting state in which a torque of the electric machine is being transmitted via the first sub-transmission to the output shaft, determining that the electric machine is to be transferred into a target shifting state in which a torque of the electric machine is to be transmitted via the second sub-transmission to the output shaft, and operating the internal combustion engine, during a transition from the initial shifting state to the target shifting state, such that an engine torque from the drive shaft of the internal combustion engine transferred to the output shaft is equal to a torque being transferred to the output shaft by the electric machine before the transfer into the target shifting state.

* * * * *